United States Patent
Preston et al.

(10) Patent No.: US 7,371,787 B2
(45) Date of Patent: *May 13, 2008

(54) METHODS OF INCORPORATING TREATMENT AGENTS INTO WOOD BASED COMPOSITE PRODUCTS

(75) Inventors: Alan F. Preston, Charlotte, NC (US); David A. Fowlie, Concord, NC (US); Kevin J. Archer, Charlotte, NC (US)

(73) Assignee: Viance, LLC, Charlotte, NC (US)

( * ) Notice: Subject to any disclaimer, the term of this patent is extended or adjusted under 35 U.S.C. 154(b) by 676 days.

This patent is subject to a terminal disclaimer.

(21) Appl. No.: 10/384,494

(22) Filed: Mar. 7, 2003

(65) Prior Publication Data

US 2004/0028934 A1 Feb. 12, 2004

Related U.S. Application Data

(63) Continuation-in-part of application No. 10/038,522, filed on Oct. 23, 2001, now Pat. No. 6,811,731, and a continuation-in-part of application No. 09/550,027, filed on Apr. 14, 2000, now Pat. No. 6,569,540.

(60) Provisional application No. 60/274,875, filed on Mar. 9, 2001, provisional application No. 60/242,505, filed on Oct. 23, 2000.

(51) Int. Cl.
*B29C 47/00* (2006.01)

(52) U.S. Cl. .................... 524/13; 523/122; 524/14

(58) Field of Classification Search ................ 524/13, 524/14; 523/122
See application file for complete search history.

(56) References Cited

U.S. PATENT DOCUMENTS

| 4,711,689 | A | 12/1987 | Coleman |
| 5,067,536 | A | 11/1991 | Liska |
| 5,755,917 | A * | 5/1998 | Barnes ..................... 156/296 |
| 6,444,329 | B1 | 9/2002 | Lehtonen et al. ........... 428/528 |
| 6,569,540 | B1 * | 5/2003 | Preston et al. ........... 428/537.1 |
| 6,686,056 | B2 * | 2/2004 | Roos et al. ................. 428/535 |
| 2003/0026942 | A1 | 2/2003 | Hejna et al. ............... 428/107 |

FOREIGN PATENT DOCUMENTS

| AU | 510 845 B | 7/1980 |
| EP | 0 666 155 A | 8/1995 |
| WO | WO 98/07553 | 2/1998 |

OTHER PUBLICATIONS

PCT/CA 97 00545 International Search Report, Oct. 28, 1997.

* cited by examiner

*Primary Examiner*—Edward J. Cain
(74) *Attorney, Agent, or Firm*—McAndrews, Held & Malloy, Ltd.

(57) ABSTRACT

A treated wood-based composite is formed by treating a green wood furnish with an amount of a treating agent effective to increase the value of the resulting wood-based composite. The treating agent can be, for example, a fire retardant, a wood preservative, a dye, a pigment, a stain, bleach, a water repellant, a drying oil, or a combination thereof. The treated green wood furnish is blended with a binder and then bound, as by pressing the furnish, to form a non-leaching fire-retardant wood based composite. Another aspect of the invention is the product formed according to the preceding process. The addition of the treating agent to green wood chips, without the need to dry them to low moisture content, is believed to be novel.

21 Claims, No Drawings

METHODS OF INCORPORATING TREATMENT AGENTS INTO WOOD BASED COMPOSITE PRODUCTS

CROSS-REFERENCE TO RELATED APPLICATIONS

This application is a continuation-in-part of U.S. Ser. No. 09/550,027, filed Apr. 14, 2000 now U.S. Pat. No. 6,569,540. This application also is a continuation-in-part of U.S. Ser. No. 10/038,522, filed Oct. 23, 2001 now U.S. Pat. No. 6,811,731, which claims priority from provisional applications U.S. Ser. No. 60/274,875, filed Mar. 9, 2001, and U.S. Ser. No. 60/242,505, filed Oct. 23, 2000. The entire disclosures of all the provisional and non-provisional applications mentioned above are incorporated herein by reference to provide continuity of disclosure.

STATEMENT REGARDING FEDERALLY SPONSORED RESEARCH OR DEVELOPMENT

Not applicable.

BACKGROUND

This invention relates to the incorporation of various treatment agents into wood composite products such as oriented strand board, medium density fiberboard, fiberboard and particleboard. The invention also relates to the method of manufacturing wood based composite products whereby treatment compositions are added to the wood furnish prior to drying, forming and pressing into a finished board or panel product. (A "wood furnish" is defined as wood strands, chips, particles, flakes or fibers. "Wood particles" are defined broadly in this specification to include webs of splintered wood formed by twisting or crushing billets of wood, as well as other forms of wood particles. A wood treatment composition can be, for two examples, a fire retardant agent or a wood preservative, as well as other treatment agents.) The invention further relates to the products made by these processes.

The production of wood based composite panel products has increased dramatically in recent years. Oriented strand board (OSB) production exceeded that of plywood in 2000. In order to continue this new growth, additional uses for OSB need to be developed. Composite wood products find application in the construction of residential housing and commercial buildings. Common applications for these products include roof sheathing, wall sheathing, flooring, structural insulated panels and engineered wood components such as I-joists. With the ever-expanding production capacity of wood based composites there is a critical need to find additional uses. One such possibility is for structural and non-structural building components to be made resistant to fire. However, by virtue of their lignocellulosic composition, wood based composites are susceptible to combustion.

Chemical preservatives and fire retardant treatments are readily available for solid lumber and plywood. Such chemical treatments are applied to lumber and plywood using vacuum pressure processes to ensure uniform distribution of the active ingredients throughout the wood components thereby guaranteeing optimum performance.

Historically, attempts to incorporate chemical treatments into wood based composites using similar technology have failed for economic reasons or more commonly because of technical problems associated with irreversible and excessive swelling of the treated panels and severe loss of structural integrity.

The incorporation of a wood preservative in aqueous form directly into green wood particles, without first drying the wood particles, is disclosed in U.S. Ser. No. 09/550,027, filed Apr. 14, 2000. That disclosure also provides wood treatments that stabilize the dimensions of the wood composite when it is exposed to environmental moisture, preventing the wood composite products from swelling. Similar incorporation of a fire retardant treatment directly into green wood particles, without first drying the wood particles, is disclosed in U.S. Ser. No. 10/038,522, filed Oct. 23, 2001.

Additional discussion of treatment of wood products is found in U.S. Published Patent Application No. 20030026942, published Feb. 6, 2003, U.S. Ser. No. 60/322,644, U.S. Ser. No. 60/288,136, and U.S. Ser. No.: 10/251,615, filed Sep. 20, 2002, all the contents of which are incorporated by reference here.

SUMMARY OF THE INVENTION

One aspect of the invention is a wood composite comprising wood particles, a binder, and at least one wood stabilizer. The wood stabilizer can be copper ammonium carbonate, copper ammonium acetate, ammoniacal copper borate, ammoniacal metal/dimethyl glyoxime, ammoniacal copper naphthenate, or combinations of two or more of these. The wood stabilizer is present in an amount effective to provide a swelling value that is less than that of an analogous wood composite not treated with the wood stabilizer.

Another aspect of the invention is a method of forming a treated wood-based composite. The method includes the steps of providing a green wood furnish and treating the green wood furnish with an amount of a treatment agent effective to increase the value of the resulting wood-based composite, compared to the value of the corresponding wood-based composite lacking the treatment agent. The treated green wood furnish optionally is dried to a moisture content suitable for fabrication of the wood-based composite. The treated green wood furnish is then bonded, as by pressing the furnish, to form a treated wood based composite.

One advantage of the present invention is that the treatment agent, even if applied as a solution or dispersion in water, effectively treats the wood flakes, but is not easily leached out of the composite board after treatment. This result is surprising. The addition of the treatment agent in aqueous form to green wood chips, without the need to dry them to a low moisture content first, is believed to be novel, and saves the energy which would otherwise be expended by drying the green wood chips before treatment, then applying the aqueous treatment (and also rewetting the chips), and finally drying the chips a second time.

DETAILED DESCRIPTION

While the invention will be described in connection with one or more embodiments, it will be understood that the invention is not limited to those embodiments. On the contrary, the invention includes all alternatives, modifications, and equivalents as may be included within the spirit and scope of the appended claims.

While the present invention is exemplified by treating OSB, the invention will find application in other composite wood materials. Broadly, the present OSB is made by providing a green wood furnish, treating the green wood furnish with a treatment agent, treating the furnish with a binder, and pressing the binder-treated furnish to form boards having the desired dimensions.

The green wood furnish can be prepared by various conventional techniques. For example, debarked pulpwood grade logs, or so-called roundwood, can be converted into a furnish in one operation with a conventional roundwood flaker. Alternatively, logs, logging residue, saplings, etc. can be cut into fingerlings in the order of 0.5 to 3.5 inches (1 to 9 cm.) long with a conventional device, such as a helical comminuting shear, and the fingerlings flaked in a conventional ring-type flaker. The woods are normally debarked prior to flaking.

In addition, milling, planing, sanding, sawing, or other wood processing waste can be processed into a suitable wood furnish. These furnishes made from processed woods may already be classified adequately in size to avoid the need for classification as outlined above.

More particularly, in one embodiment the strands are produced on waferizers and transferred to a primary green storage bin. From the primary green bin the strands are metered out and pass through a green screening operation to remove undesirable fine material. The strands are transferred from the green bin to a dryer chute at a continuous rate depending upon the floor speed of the bin, by means of picker rolls. These picker rolls fling the strands into the air effectively separating them from one another into individual flakes.

For best results with oriented wood composite products, the wood flakes should have an average length of from about 0.5 inch to about 5 or 6 inches (1-15 cm). The flakes can alternatively be about 1 inch to about 2 inches (3-5 cm) long. The flakes can have an average thickness of about 0.01 to about 0.05 inch (0.25 to 1.25 mm), alternatively about 0.015 to about 0.025 inch (0.38 to 0.63 mm), alternatively about 0.02 inch (0.5 mm). Flakes longer than about 3.5 inches (9 cm) may tend to curl, which hinders proper alignment during mat formation. It is difficult to insure that flakes shorter than about 0.5 inch (1 cm) will not become aligned with their grain direction cross-wise. Flakes thinner than about 0.01 inch (0.25 mm) tend to require excessive amounts of binder to obtain adequate bonding, and flakes thicker than about 0.05 inch (1.3 mm) are relatively stiff and tend to require excessive compression to obtain the desired intimate contact between them. In any given batch, some of the flakes generally will be shorter than 0.5 inch (1 cm) or longer than 6 inches (15 cm). The same is true for the width and thickness of the flakes. The size of the flakes is not regarded as critical, and the flake size may deviate from the above-stated sizes without departing from the scope of the invention. In particular, fibers having dimensions smaller than those provided above are commonly used for manufacturing medium density fiberboard. Particleboard is made from flakes having major dimensions of about 0.5 to 1 inch (12-25 mm) and a thickness of about 0.01 to 0.015 inch (0.25-0.4 mm).

To facilitate proper alignment in oriented wood composites like OSB, the flakes can be several times as long as they are wide, for example, about 4 to about 10 times as long. Using this constraint as a guide, the average width of the flakes generally can be from about 0.1 to about 2.5 inches (2.5 to about 64 mm), alternatively from about 0.1 to about 0.5 inch (2.5 to 13 mm), and their average thickness can be about 0.015 to about 0.025 inch (0.38 to 0.63 mm). In one embodiment, elongated wood flakes can be provided predominantly having a grain direction extending generally parallel to their respective longitudinal axes. The flakes can have an average length of about 0.5 inch to about 5 or 6 inches (1-15 cm), an average length to average width ratio of about 4:1 to about 10:1, and an average thickness of about 0.01 to about 0.05 inch (0.25 to 1.25 mm). Again, these numbers are typical, but not critical to practicing the present invention. Non-oriented products like particleboard and medium density fiberboard can be made from more compact flakes that can be about as wide as they are long.

The wood furnish of oriented wood composite products can be assembled or maintained as one or more strata or layers. In a layer, the furnish can have a grain direction extending generally parallel to the machine direction—the direction of travel of wood through the process. In one oriented strandboard embodiment contemplated here, at least 90% of the particles in the wood furnish are oriented in the recited manner.

The present inventors have discovered that a green wood furnish having a high moisture content can usefully be employed in the present process, which eliminates or materially reduces the need, and thus the cost, of pre-drying the furnish. For the purpose of the present disclosure, "green wood" includes both (1) wood that has not been dried; and (2) wood that has been dried and has been rewetted to a moisture content of at least about 30% MC. The use of a green wood furnish ensures that the penetration of the treatment agent is maximized.

The fiber saturation point of wood, at which the fibers are saturated with water, is generally considered to be about 30% moisture content (based on dry wood weight), dependent on species. The moisture content of a green wood furnish commonly exceeds the fiber saturation point. The present fire retardants work at moisture contents both below and above the fiber saturation point. Thus, the present method can be carried out using either the dried furnish of the prior art or a furnish containing any amount of moisture, including moisture levels characteristic of green flakes.

The moisture content of the green wood furnish just before treatment may be at or above the saturation point of the wood, alternatively on the order of from about 30% to about 100% by weight (based on the weight of dry wood), alternatively from about 40% to about 100% by weight. The moisture content may optionally be from about 60% to about 80% by weight, optionally from about 50% to about 70% by weight, based on the weight of dry wood. Moisture contents outside these ranges that are found in green wood are also contemplated. In contrast, the moisture content to which the furnish is dried traditionally has been in the order of from about 20 weight % to about 3 weight % or less, based on the dry weight of the furnish.

The treatment agents contemplated herein can be any aqueous dispersion (i.e. solution or suspension) used to treat wood to increase its value in some respect. Several examples of contemplated treatment agents include: fire retardants to reduce the flammability of wood; wood preservatives to prevent fungi, bacteria, termites, and other microbial and higher pests from attacking or decaying wood; dyes, pigments, stains, and bleaches to color or bleach wood; water repellants, etc.

The treatment agents do not need to be entirely aqueous. Some nonaqueous treatment agents can also be applied to a green wood furnish.

Generally, any fire retardant that is applied in the form of an aqueous dispersion is contemplated to be useful for practicing the present invention. One type of fire retardant contemplated herein is a phosphate/borate composite composition. One class of these compositions employs an inorganic monobasic, dibasic, or tribasic phosphate with the borate. Examples of suitable phosphates include alkali metal phosphates, alkaline earth metal phosphates, ammonium phosphates, such as monoammonium phosphate or diammonium phosphate, or others. A system for incorporating an ammonium phosphate/borate fire retardant treatment (fire-retardant treatment) into the manufacturing process for wood based composites is disclosed in U.S. Pat. No. 4,725,382 (which is hereby incorporated herein by reference in its entirety for its description of fire retardant compositions and their use). Ammonium phosphate/borate fire retardant treatments (fire-retardant treatment) are commercially available from Chemical Specialties, Inc., Charlotte, N.C.

In addition to these inorganic phosphate/borate treatments, organic phosphate treatment agents can be used in combination with borates. The organic phosphates contemplated here include: 1) a combination of urea, dicyandiamide, phosphoric acid, and formaldehyde (UDPF) (see U.S. Pat. Nos. 5,185,214 and 3,887,511), 2) a combination of melamine, dicyandiamide, phosphoric acid, and formaldehyde (MDPF) (see U.S. Pat. No. 5,185,214), 3) a combination of dicyandiamide, phosphoric acid, and formaldehyde (DPF) (see U.S. Pat. Nos. 5,185,214 and 3,159,503); 4) the guanyl urea phosphates, including the amino-resins (see U.S. Pat. No. 5,395,656); 5) a combination of an amide, dicyandiamide and phosphoric acid (see U.S. Pat. Nos. 2,917,408 and 5,151,225); 6) a phosphate salt of methylolated guanyl urea (see U.S. Pat. No. 5,151,225); or 7) a combination of phosphoric acid, melamine or urea and formaldehyde (see U.S. Pat. No. 3,874,990). The portions of the patents cited in this paragraph pertinent to organic phosphates as fire retardants are hereby incorporated herein by reference. Other organic phosphates known to those skilled in the art may also be used.

U.S. Pat. No. 4,461,720 discloses another contemplated fire retardant. This fire retardant composition is prepared by first converting dicyandiamide to an aqueous guanyl urea solution. The guanyl urea solution is then methyolated and phosphoric acid is introduced in order to product a phosphate salt of the methyolated guanyl urea. This reference also describes a treatment solution made by combining urea; phosphoric acid; water; borax; boric acid; and sodium hydroxide. U.S. Pat. No. 4,461,720 also describes the preparation of guanyl urea phosphate and related compounds from dicyandiamide. These materials are contemplated to be useful as the phosphate component of a phosphate/borate fire retardant. The portions of the patents cited in this paragraph pertinent to organic phosphates as fire retardants are hereby incorporated herein by reference.

Other pertinent organic phosphate fire retardant compounds for wood are disclosed in U.S. Pat. Nos. 5,094,890; 4,010,296, and 3,986,881. The portions of the patents cited in this paragraph pertinent to organic phosphates as fire retardants are hereby incorporated herein by reference.

The addition rate for the fire-retardant treatment formulation may range from 2% m/m active ingredient to 20% m/m active ingredient defined on a $P_2O_5$ equivalent basis. The eventual fire resistance properties of the finished panel are proportionally linked to the weight percentage of fire-retardant treatment formulation incorporated into the furnish.

Generally, any wood preservative that is applied in the form of an aqueous dispersion is contemplated to be useful for practicing the present invention. Some particular types of wood preservatives contemplated herein are an ammoniacal wood stabilizer, a metal/dimethyl glyoxime stabilizer, or a combination of those stabilizers. The stabilizer desirably is present in an amount and form recognized in the industry as effective to preserve the wood. "Preservation" is used broadly in this specification to refer to any treatment that reduces the rate of deterioration of a wood composite, compared to the rate of deterioration of an analogous wood composite lacking the preservative.

The wood preservatives mentioned in the previous paragraph can also be used as dimensional stabilizers for wood composites. For this purpose, the treatment is used in an amount effective to reduce the moisture-induced swelling of the composite to less than that of an analogous wood composite not treated with the wood stabilizer.

Another wood preservative contemplated for application to a green wood furnish is a copper based preservative system, commercially available as the COMPTEC™ copper ammonium acetate complex wood treatment. The COMPTEC treatment may optionally be used in combination with "drying oils" such as linseed, soybean, canola, sunflower, tung and castor oils and any other oils derived from agricultural sources and functioning as described herein into the manufacturing process for wood based composites.

The oil copper combination can be applied to green or wet furnish at a moisture content above fiber saturation point (i.e. above 30% MC). The use of green wood furnish ensures that the penetration of the preservative system into the wood flakes is maximized for optimum efficacy.

The addition rate for the copper ammonium acetate complex wood treatment formulation may range from 0.5% m/m (i.e. "mass-to-mass" or weight %) active ingredient to 5% m/m active ingredient defined on a Copper ammonium acetate complex basis. The "drying oil" addition rate may vary from 0.5% to 15% m/m. The lower limit of drying oil addition can alternatively be 1%, 1.25%, 2%, 2.5%, 3%, 4%, or 5% by wood weight, on the same basis. The upper limit of drying oil addition can alternatively be 14%, or 13%, or 12%, or 11%, or 10%, or 8%, or 6%, or 5% by wood weight, on the same basis. The decay and tennite resistance performance of the finished panels are proportionally linked to the weight percentage of copper ammonium acetate complex wood treatment incorporated into the furnish. Similarly improvements in water absorption and thickness swell is proportionally related to the level of oil incorporated into the matrix.

The synergistic relationship between the COMPTEC™ wood treatment and the oil results in mechanical panel properties that are superior to those expected with conventional resin systems alone. The increase in mechanical properties correlates with the quantity of oil and copper ammonium acetate complex wood treatment added to the furnish. Given a consistent resin loading, as the level of oil increases per given level of copper ammonium acetate complex wood treatment, the mechanical properties improve significantly.

The moisture resistance of the wood product can be improved by spraying a liquid wax emulsion onto the particles during or after the stabilizer blending step. The wax can be, for example, the aliphatic or paraffinic petroleum product commonly known as slack wax. Slack wax is the wax recovered from a petroleum hydrocarbon by either solvent or propane dewaxing, and can contain entrained oil in an amount varying up to about 50%, alternatively 35% oil. This is the first waxy material separated in the refining of crude oil.

Molten or emulsified wax is applied to the particles. The amount of wax added generally is about 0.5 to about 5 weight %, as solids, based on the dry weight of the particles. Alternatively, the amount of wax can be at least about 1% of the oven dry weight of the wood particles. Alternatively, the amount of wax can be at least about 2% of the oven dry weight of the wood particles. The wax or other water repellant may be added after one or more other treatment agents or with one or more other treatment agents, but preferably is not added before other wood treatments that are intended to penetrate into the wood particles. It is contemplated that adding the other treatment agents no later than the water repellant allows the other treatment agents to penetrate deep into the particles, before the water repellant excludes them.

In some instances it is useful, after treating the particles with the treatment agent, to allow the particles to remain in contact with the treatment agent to give the agent time to penetrate into the particles. This step is particularly contemplated if the particles are green and thus retain a substantial proportion of water. Contact time allows exchange between the water in the particles and the water containing the treatment agent, allowing diffusion of treatment agents into the particles. At least an hour of contact time is contemplated, though more or less contact time may be useful in given circumstances.

If necessary or desired in a given instance, the furnish can be partially dried prior to classification to prevent the wood particles from sticking together, thus assisting classification, or to provide other benefits. The chips nonetheless can be classified and used when they are very moist, and while they still meet one of the moisture content ranges contemplated above for the present invention.

In one embodiment, from the green screening operation the strands move over a weigh belt and under a moisture detection device that is slaved to the green blending operation. The strands flow into a rotating blender. One or more treatment agents are applied at the desired active level based upon the weight and moisture content of the incoming furnish using an air atomizing spray system or coil spinning disc atomizing equipment. After treatment the furnish continues through the regular production process and is transferred into a drier, optionally via a secondary green bin.

In another embodiment, the airborne, separated strands leaving the picker rolls are sprayed with the treatment agent. The treatment agent chemical is applied with an airless or air assisted spray system set up to provide optimal coverage and distribution of the solution onto the surface of the flakes. Alternatively, if the volume of headspace available is adequate, atomizers are used to apply the solution. The quantity of wood furnish (weight) moving through the green bin is determined by measuring or otherwise determining the wood feed speed and thus wood volume flow rate. The wood volume flow rate information is used to control the treatment agent application rates through a slaving device to a pump system. A moisture content measuring device can be incorporated into the feed back loop to ensure the accuracy of the wood flake flow rate. After treatment the furnish continues through the regular production process and is transferred into a dryer, optionally via a secondary green bin.

Alternatively, the fire-retardant treatment is applied by spraying or dipping the flakes with treatment agent solution as they exit the waferizer. In one embodiment, the treatment agent solution is sprayed at the interface of the log/disc head as the flakes are being cut. To facilitate accurately applying the fire-retardant chemical to achieve a desired loading, the wet weight of wood is measured with a weigh belt as the logs are transferred down the feed conveyor to the flaker. The wood moisture content is estimated from variables such as the season, time from felling, and other factors known to those skilled in the art to estimate the wood weight going through the waferizer. A pumping/spray system is slaved to the wood weight data to control the application rate. Once treated the strands continue through the OSB process.

Yet another alternative is to apply the fire-retardant treatment in dry, powdered form to the green flakes, which has the potential to still further reduce the amount of water that must be dried from the flakes. The water in the green flakes, particularly the water expressed when the flakes are pressed to form a board, solubilizes or transports at least part of the fire-retardant treatment into the flakes.

Still other methods for incorporating the fire-retardant treatment into green wood chips will be readily devised by a person of ordinary skill in the art, in view of the present disclosure.

The resultant furnish is formed into a loosely felted, layered mat (single or multi-layered), which may be made continuously in a roller process or as discrete billets in a molding process. Sufficient pressure (with or without heat) is applied to the mat by a roller, press, or other means to compress it to the desired thickness and shape for the structural member being made and to bond the wood furnish together.

Other additives, such as coloring agents, stabilizing ingredients, and the like may also be added to the particles before, during, or after the treatment agent blending step.

The fire-retardant treatment treated furnish is dried using conventional drying equipment to a moisture content appropriate to the type of resin system that will be used and the composite that will be made. This can range from 0.5% to 25% MC based on the oven-dry density of the furnish.

The moisture resistance of the structural member can be improved by spraying a liquid wax emulsion onto the particles during or after the stabilizer blending step. The wax can be, for example, the aliphatic or paraffinic petroleum product commonly known as slack wax. Slack wax is the wax recovered from a petroleum hydrocarbon by either solvent or propane dewaxing, and can contain entrained oil in an amount varying up to about 50%, alternatively 35% oil. This is the first waxy material separated in the refining of crude oil.

Molten or emulsified wax is applied to the particles. The amount of wax added generally is about 0.5 to about 5 weight %, as solids, based on the dry weight of the particles. Alternatively, the amount of wax can be at least about 1% of the oven dry weight of the wood particles. Alternatively, the amount of wax can be at least about 2% of the oven dry weight of the wood particles. The wax or other water repellant may be added after the fire-retardant treatment or with the fire-retardant treatment, but preferably is not added before the fire-retardant treatment. It is contemplated that adding the fire-retardent treatment no later than the water repellant allows the fire-retardant treatment to penetrate deep into the particles, before the water repellant excludes it.

In one contemplated embodiment, the wood particles are treated with the treatment agent, then with the wax, then dried.

Another step in the process is the application of a suitable binder or adhesive to bind the wood particles together. Suitable binders include those used in the manufacture of oriented strandboard, particleboard, fiberboard, and other chemical wood particle bonding systems. Resinous oriented strandboard binders presently are preferred. Representative examples of suitable binders include thermosetting resins. Other resins may also be utilized.

The specific resins that may be used include phenolic, urea formaldehyde (UF), phenol formaldehyde (PF) in a liquid or powder state, liquid melamine urea formaldehyde (MUF), resorcinol-formaldehyde, melamine-formaldehyde, urea-furfural, condensed furfuryl alcohol, acid catalyzed PF resins (commonly known as Novalac resins) isocyanate (MDI), or combinations of those resins. The particular type of binder used depends primarily upon the intended use for the structural member. For instance, structural members made with urea-formaldehyde resins have sufficient moisture durability for many uses that involve minimal exposure to moisture, but generally cannot withstand extended outdoor exposure. Phenol-formaldehyde and melamine-formaldehyde resins provide the structural member with durable properties required for long-term exterior applications.

Addition rates may vary from 1% to 15% resin solids depending on panel type and application. Ideally a PMF (Phenol-melamine-formaldehyde) adhesive, for example ARC-9707, is used in the addition rate of 2-15% active. More ideally the resin should be used at an addition rate of 3-8% active. Under normal circumstances the use of this resin dictates the use of an acid catalyst. Catalyst addition rates that are typically recommended for this purpose can vary from 0.5% to 15% on a liquid to liquid basis. Before this invention was made, ideally the addition rate was from 3-9% on a liquid to liquid basis. As has been explained further below, the catalyst can be reduced, or in some instances eliminated, when practicing the present invention.

The binder can be admixed with the particles in either dry or liquid form. To maximize coverage of the particles, the binder can be applied by spraying droplets of the binder in liquid form onto the particles as they are being tumbled or agitated in a blender. A web of loosely consolidated particles can be dipped through a bath of the binder or sprayed with the binder. The binder may also be introduced into a mold, preceded or followed by insertion of a charge of particles to be bound together in the mold. Foaming techniques may be applied to foam the resin to assist in spreading the resin and to fill any voids that might occur between the particles, while minimizing the amount of water employed in the process or taken up by the particles.

Any processing equipment can be used to prepare the treated wood particles. For example, the particles can be circulated in a rotating drum mixer and sprayed with the fire-retardant treatment, wax, and binder using one or more Coil spinning disc atomizers.

The particles are formed by suitable apparatus into a generally flat, loosely-felted mat, having one or more layers, and the mat is placed in a suitable press and compressed to consolidate the wood particles into a structural member of the desired size and cross-sectional shape. For example, the particles can be deposited on a plate-like carriage carried on an endless belt or conveyor from one or more hoppers spaced above the belt in the direction of travel. When a multi-layered mat is formed, a plurality of hoppers is used with each having a dispensing or forming head extending across the width of the carriage for successively depositing a separate layer of the particles as the carriage is moved beneath the forming heads.

The process can be carried out on a batch basis, i.e. individual sheets of the wood composite can be molded by treating an appropriate volume of particles with the binder resin combination and heating and pressing the treated material. Alternatively, the process can be carried out in a continuous manner by feeding treated particles in the form of a continuous web or mat through a heating and pressing zone defined by upper and lower continuous steel belts, through which the necessary heat and pressure are applied.

The mat thickness will vary depending upon such factors as the size and shape of the wood particles, the particular technique used in forming the mat, the desired thickness and density of the structural member or component, and the pressing pressure used. The mat thickness usually is about 5 to 6 times the final thickness of the structural member or component. For example, for a structural component having a 1-inch (2.5 cm) thickness and a density of about 40 lbs/ft$^3$ (0.64 g/cm$^3$), the mat usually will be about 5-6 inches (about 13-15 cm) thick. If the mat is thicker than about 25-30 inches (64-76 cm), it usually must be partially pre-compressed to a reduced thickness, with rollers or the like, prior to introduction into the press.

Pressing temperatures, pressures, and times vary widely depending on the thickness and the desired density of the structural member or component, size and type of wood particles, moisture content of the particles, and the type of binder. The pressing temperature used is sufficient to at least partially cure the binder and expel water from the mat within a reasonable time period, without charring the wood. Generally, a pressing temperature ranging from ambient (for room temperature-curable binders) up to about 450° F. (230° C.) can be used. Temperatures above 450° F. (230° C.) can cause charring of the wood particles. A pressing temperature of about 350° F. (175° C.) to about 425° F. (220° C.) is generally preferred for phenol-formaldehyde resin binders.

The pressure should be sufficient to press the wood particles into intimate contact with each other without crushing them to the point causing a breakdown of fibers with a resultant degradation in structural integrity. The pressure usually is about 325 to about 500 psig (224 to 345 N/cm$^2$).

The pressing time is sufficient to partially cure the binder to a point where the structural member or component has sufficient integrity for handling. The press cycle typically is about 2 to about 20 minutes; however, longer times can be used when pressure-curing binders are employed or when more complete curing of thermosetting binders is desired.

The pressed boards may be cooled, stacked to allow time and air circulation, and sanded to uniform smoothness and thickness, as is conventional.

When fire retardant treated flakes are used in combination with the PMF resin system described above, the level of catalyst needed to cure the resin can be reduced, and potentially reduced to zero, while at the same time permitting the manufacture of boards with excellent mechanical and physical properties as will be demonstrated later in Example 3.

The dry treated furnish is sprayed with resin and wax, formed and oriented into a mat of the desired thickness and pressed into the final panel. The physical and structural characteristics of the fire-retardant treatment enhanced wood based composite can be equivalent in magnitude to similarly manufactured but untreated composites.

Mats are formed to suit the type of composite and desired end use. Formed mats are pressed under heat and pressure conditions appropriate to the final end use of the finished board. Typical press parameters include consolidation pressures ranging from 50 psig (35 N/cm$^2$ gauge pressure) to 650 psig (450 N/cm$^2$ gauge pressure), cook pressures from 0 psig (0 N/cm$^2$ gauge pressure) to 400 psig (275 N/cm$^2$ gauge pressure), and a de-gas segment. Typical press temperatures vary from 200° F. (93° C.) to 550° F. (290° C.), depending on the type of composite. Press time may vary from 1 minute to 20 minutes duration.

The fire resistance of wood based composites, including those already treated with a fire retardant, can be enhanced if the panels are also surface treated by spray or dip application with an intumescing type fire retardant formulation.

Examples illustrating several applications of the invention using oriented strand board as the matrix are presented below.

EXAMPLE 1

Wood Preservation and Dimensional Stability

A CAC stabilizer composition is made containing 24.1% by weight copper ammonium carbonate and 75.9% of inert ingredients. This preservative has a metallic copper equivalent of 8% by weight and a copper oxide (CuO) equivalent of 10% by weight. The above preservative composition is dissolved in ammonia to give an aqueous solution within the pH range of 8-11. The weight of ammonia is at least as great as the weight of copper oxide. To aid in solution the treating solution contains carbonate anion. The amount of carbonate, expressed as $CO_2$, is at least 0.25 times the amount of copper oxide on a weight basis. The copper ammonium carbonate content of the treating solution can be from about 20% to about 28% by weight. The applicable standard analytical procedures of the American Wood Preservers' Association can be used to determine these values.

The composition of the treating solution may deviate outside the limits specified above. In that case the preservative retention in treated material is desirably determined by assay and the retention so determined is at least 0.60 pcf (9.6 $Kg/m^3$), and at least 0.96 pcf (15 $Kg/m^3$) for maximum termite and decay resistance of the treated wood. These retentions are expressed in terms of copper ammonium carbonate equivalent.

Thick strands of aspen combined with a portion of pine and birch, up to 35 thousandths of an inch thick, were obtained from Potlatch, Grand Rapids, Minn. These strands were treated with sufficient copper ammonium carbonate wood preservative treatment solution and allowed a sufficient holding time to provide a preservative retention level of 0.6 pcf (9.6 $Kg/m^3$). The strands were dried after treatment to 4-5% moisture content (MC). The treated strands were made into OSB panels using a 24-inch (61-cm) square press, using the conditions specified in Table 1.

The test results for these samples are provided in Table 1. Table 1 shows that the internal bonds (IB's) of the copper ammonium carbonate (CAC) treated material are equivalent to those of the untreated panels. The thickness swell and water absorption numbers were much lower in the CAC treated panels than in the untreated material.

TABLE 1

IB, Thickness Swell, Water absorption -- from laboratory panels

| Measurement | Untreated | Copper ammonium carbonate (CAC)Treated (0.60 pcf, 9.6 Kg/m³ CAC) |
|---|---|---|
| IB (psi) | 38 | 39 |
| IB (N/cm²) | 26 | 27 |
| Thickness swell (%) | 23.8 | 14.5 |
| Water absorption (wt. %) | 55.7 | 40.3 |

| | |
|---|---|
| Resin | 2.3% powdered phenol-formaldehyde (PF) core and face |
| Wax | 1.0% solids of a 58% emulsion |
| Panel thickness | ½ inch (1.3 cm) |
| Panel density | 40 pcf (0.64 g/cm³) |
| Press temp | 400° F. (204° C.) |
| Press time | 5 minutes |

TABLE 1-continued

IB, Thickness Swell, Water absorption -- from laboratory panels

| Number of samples | 20 for internal bond (IB), 9 for water absorption and thickness swell (WATS) |
|---|---|

EXAMPLE 2

Development of a Class One Fire Rated Oriented Strand Board Panel

Aspen strands were obtained from an OSB mill in northern Minnesota. The strands were primarily aspen with a limited percentage of white birch, red pine, and balsam mixed in. On receipt from the mill it was determined that the strands were at a moisture content of 4% (oven-dry basis). To simulate wet end mill conditions, the strands were re-wetted to 50% moisture content, oven-dry basis in a 6 ft. diameter blender and allowed to sit for 24 hours to allow complete migration of the water into the cores of the strands.

Three different addition rates of the Compsol® fire-retardant treatment product (2, 4, and 8 percent m/m $P_2O_5$ equivalent) were evaluated in this Example, to determine the relationship between fire-retardant treatment loading and performance. Compsol® is a patented (U.S. Pat. No. 4,725,382) ammonium phosphate/borate based fire retardant treatment that is clear in appearance. The nominal active ingredient content in the concentrate is of 23.7% based on $P_2O_5$ equivalence. All subsequent references to Compsol® loadings will be made on a $P_2O_5$ equivalence basis.

Addition rates were based on active ingredient content of the Compsol® and oven-dry basis of the strands. Untreated control panels were included for comparison. Four panels were manufactured at each addition rate, including the controls. A total of 16 panels were made.

The Compsol® concentrate was sprayed on to the green (rewetted) strands in a rotating 6 ft. (2 meter) diameter blender. One hour after treatment the fire-retardant treatment treated strands were dried to a moisture content of 3-4% on an oven-dry basis in a laboratory dryer.

The resin used for this Example was a phenol-melamine formaldehyde blend (PMF) commercially produced by ARC resins (ARC 9707). Typically, the use of a catalyst (ARC 9700) is required with this resin. It has been determined from previous OSB laboratory studies utilizing ARC 9707, that a catalyst addition rate of 6.5% maximizes panel properties. This addition rate is based on liquid weight of the catalyst and liquid weight of the resin. A wax additive was also used in this Example as a dimensional stabilizer. The wax used was a typical petroleum based wax emulsion, supplied by Borden Chemical (EW 58S), with a solids content of 58%. Both resin and wax were applied in the same 6 ft. (2 meter) diameter blender that was used for rewetting the strands and for treatment with Compsol®.

The blender was equipped with a Coil EL-4 spinning disc atomizer. Resin and wax addition rates were held constant for all four panel sets. Target resin addition rate was 4.5%, based on resin solids and oven-dry weight of the strands and Compsol® mix. Wax addition rate was 1.0% based on wax solids and oven-dry weight of the aspen and Compsol® mix.

After resin and wax addition, the strands were hand formed with a random orientation into 24 inch by 24 inch (61 cm by 61 cm) mats onto tight woven screens to allow off-gassing during the pressing operation. The mats were homogenous, in that there was no differentiation between the core and face layers. Pressing was accomplished using a 100-ton (90 metric ton) Wabash lab press. Press platen temperature was 380° F. (190° C.). Panels were consolidated to target thickness of ½-inch (13 mm) in 30 seconds at 550 psig (380 N/cm$^2$). Pressure was reduced to 250 psig (172 N/cm$^2$) after one minute. Total press time was six minutes with an additional 30 seconds de-gas. The target density was elevated slightly from the industry standard 39 pcf (pounds per cubic foot) (0.63 g/cm$^3$) to 42 pcf (0.67 g/cm$^3$) to compensate for the solids loading of the fire-retardant treatment. Panels were hot stacked for 24 hours to allow for total resin cure prior to testing. Finally the test panels were trimmed to dimensions of 1 inch×1 inch (25 mm by 25 mm) using a table saw.

The panels were tested for flame spread rating as well as mechanical and physical properties. Flame spread index was determined using a modified two foot (61 cm) tunnel test (ASTM D3806). Four specimens from each set were evaluated. A class one rating is desired which is equivalent of a flame spread index from 0 to 25. This is determined according to the length of the flame spread on a two foot (61 cm) specimen after a flame exposure of four minutes. The tested mechanical and physical properties included internal bond, stiffness (MOE), strength (MOR), water absorption, and thickness swell. ASTM protocols were followed for mechanical and physical panel testing.

The addition of the fire retardant changed the appearance of the finished panels in at least two ways. The first observation was that the overall color of the boards became a darker brown. The intensity of the brown increased with increasing fire retardant concentration. In addition, a bright yellow particulate deposit was observed randomly distributed on and around the flakes. The amount of the deposit present seemed to increase with increasing fire retardant loading. The yellow material was not easily dislodged by mechanical scraping and could not be washed off the surface of the boards with deionized water. Although they do not intend to be bound to the accuracy of this theory, the inventors believe that the product is formed from a reaction of the fire retardant with the resin/catalyst combination.

In addition to the visual changes in the treated panels test data revealed that the panel mechanical properties and flame spread properties of the treated panels were changed. The incorporation of the Compsol® fire-retardant treatment did not adversely affect the internal bond values at any of the addition rates (Table 2A). There was no significant (P<0.05) difference in internal bond values between controls or any of the addition rates of Compsol®.

There was no significant (P<0.05) difference in the MOR (strength) of the four combinations evaluated (Table 2C). However, the MOE (stiffness) of the panels was influenced by increasing amounts of Compsol®. There is a curvilinear relationship between Compsol® addition rate and stiffness. As the percentage of Compsol® was increased from 0-4%, the stiffness increased then tailed off at the 8% loading. This tailing off effect of the stiffness at 8% Compsol® loading may or may not be due to the addition rate. As indicated before, the resin used in this Example was an acid catalyzed material. The resin and catalyst levels were held constant for all four combinations. At the 8% loading of Compsol® the addition of this fire retardant is believed to impart a catalytic effect on the resin cure rate given the parameters used in this study. Hence, the inventors contemplate that the catalyst level should be reduced to optimize bending properties at higher Compsol® loadings.

The impact on water absorption and thickness swell (WATS) values was an inverted curvilinear relationship (Table 2B). As the percentage of Compsol® increased to 4%, the thickness swell and water absorption decreased. At the 8% Compsol® loading, the values increased somewhat, but were still comparable to the control values.

Flame spread index (FSI) and gross smoke generation improved as the loading rate of Compsol® increased in the panel. Without the fire retardant treatment in the panel the flame spread result indicated that the test panels qualified for a class 3 (C) rating. In addition, significant amounts of smoke were generated during the test. The 2% loading rate of Compsol® produced panels with a class 2 (B) FSI, and with still a fair degree of smoke generated. At the 4% addition rate of fire-retardant treatment, an average FSI of 25, the upper limit of a class 1 (A) rated panel, was achieved. There was very little smoke generated. At the 8% addition rate of Compsol®, a class 1 (A) FSI was easily achieved, with very little smoke generated.

From the results of this study, it can be concluded that the manufacture of a fire-retardant treatment rated OSB is viable, given an appropriate combination of resin, fire-retardant treatment, and pressing parameters.

TABLE 2A

| Internal Bond | |
|---|---|
| Treatment Face/core (% m/m P$_2$O$_5$) | IB PSI (N/cm$^2$) |
| Control | 57.8 (39.9) |
| 2/2 Compsol ® | 54.9 (37.9) |
| 4/4 Compsol ® | 59.0 (40.7) |
| 8/8 Compsol ® | 50.4 (34.8) |

TABLE 2B

| Water absorption/Thickness swell | | |
|---|---|---|
| Treatment Face/core (% m/m P$_2$O$_5$) | Water absorption (%) | Thickness swell (%) |
| Control | 29.2 | 8.4 |
| 2/2 Compsol ® | 27.8 | 8.1 |
| 4/4 Compsol ® | 25.6 | 6.9 |
| 8/8 Compsol ® | 32 | 8.2 |

TABLE 2C

| Static bending | | |
|---|---|---|
| Treatment Face/core (% m/m P$_2$O$_5$) | MOR PSI (N/cm$^2$) | Stiffness PSI (KN/cm$^2$) |
| Control | 5390 (3716) | 957,000 (660) |
| 2/2 Compsol ® | 3930 (2710) | 1,030,000 (710) |
| 4/4 Compsol ® | 5150 (3551) | 1,170,000 (807) |
| 8/8 Compsol ® | 3728 (2570) | 918,000 (633) |

EXAMPLE 3

Fire Retardant Leaching Test

The ratio of phosphorus to boron in Compsol® concentrate is approximately 3.2:1 based on P$_2$O$_5$ and boric acid equivalence. It is well known that Compsol® is readily leached by water from pressure treated lumber and plywood. The absolute concentrations of P and B in sample 1 which contains no Compsol® fire retardant are very low. The P to B ratio in sample 1 is approximately 5. These values presumably reflect background levels inherent in the resin catalyst chemistry. Table 3 shows that the P to B ratio for sample 1 did not change after extraction.

Samples 3 and 4, by virtue of the fact that powdered Compsol® was used in the blend, most closely approximated the chemical environment present on the treated flakes.

The absolute concentrations of P and B in samples 2, 3 and 4 (all of which contained the Compsol® fire retardant) varied widely before extraction. However, the P to B ratios for the three samples were similar to that expected from the Compsol® concentrate, suggesting that the observed values reflect the presence of fire retardant and not an aberration due to background levels.

After extraction the total boron and phosphorus levels in samples 2, 3 and 4 decreased. This indicated that these components were at least partially dissolved by the water. The percentage loss of phosphorus was least in sample 3 which contained no catalyst. The ratio of P to B in sample 3 after extraction was much greater than the ratios of P to B in samples 2 and 4. Potentially this result seems to suggest that in the absence of catalyst the propensity of the fire retardant to leach is greatly reduced. Conceptually this may maintain the fire retardant properties of Compsol® treated under service conditions and it also supports the hypothesis that the fire retardant is able to chemically react with the resin system producing novel compounds resistant to leaching by liquid water.

TABLE 3

In-vitro resin/catalyst/fire-retardant interactions

| | Pre-extraction | | | Post Extraction | | |
|---|---|---|---|---|---|---|
| Sample | Phosphorus Conc. (as % $P_2O_5$) | Boron Conc. (as % $H_3BO_3$) | P:B ratio | Phosphorus Conc. (as % $P_2O_5$) | Boron conc. (as % $H_3BO_3$) | P:B ratio |
| 1 | 23.7 0.311 | 7.5 0.062 | 3.2 5 | 0.242 | 0.045 | 5.4 |
| 2 | 11.6 | 4.26 | 2.7 | 0.398 | 1.07 | 0.37 |
| 3 | 2.18 | 0.557 | 3.9 | 1.11 | 0.534 | 2.1 |
| 4 | 14.6 | 4.05 | 3.6 | 1.02 | 1.63 | 0.6 |

Sample 1: Liquid PMF resin + acid catalyst
Sample 2: Liquid PMF resin + catalyst + liquid Compsol ® fire-retardant
Sample 3: Liquid PMF resin, no catalyst + powdered Compsol ® fire-retardant
Sample 4: Liquid PMF resin + catalyst + powdered Compsol ® fire-retardant Further test results showing the benefit of the present invention in the context of fire retardant and wood preservative treatment compositions can be found in the patent applications incorporated by reference in this specification.

Therefore, a method of treating a composite wood product has been disclosed, comprising the steps of providing a green wood furnish and treating the green wood furnish with an amount of at least one first treatment agent effective to increase the value of the resulting wood-based composite. Optional further steps include: drying the treated green wood furnish to a moisture content suitable for fabrication of the wood-based composite; blending the treated green wood furnish with a binder; binding the green wood furnish to form a wood based composite; and during or after the first treatment agent treatment, applying a water repellant treatment agent to the green wood furnish to form treated wood particles. The products of these processes are also claimed.

The green wood furnish can comprise aspen flakes, and can have a moisture content of from about 60% to about 100%, based on dry wood weight, just before the treatment agent applying step.

The first treatment agent can be a fire retardant, a wood preservative, a dye, a pigment, a stain, a bleach, a water repellant, a drying oil, or a combination thereof. The treatment agent can be applied from an aqueous dispersion.

The water repellant material can a paraffinic wax such as slack wax.

The first treatment agent and the water repellant treatment agent can be applied from a single emulsion.

What is claimed is:

1. A wood composite comprising:
   A. wood particles,
   B. a binder, and
   C. at least one wood stabilizer comprising copper ammonium carbonate, copper ammonium acetate, ammoniacal copper borate, ammoniacal metal/dimethyl glyoxime, ammoniacal copper naphthenate, or combinations thereof, present in an amount effective to provide a swelling value that is less than that of an analogous wood composite not treated with said wood stabilizer.

2. The wood composite of claim 1, wherein said wood particles are flakes having an average length of from about 0.5 inch to about 6 inches (1 to 15 cm), an average thickness of from about 0.01 to about 0.05 inch (0.2 to 1.3 mm), and an average width of from about from about 0.1 to about 2.5 inches (2 to 64 mm).

3. The wood composite of claim 1, wherein said wood particles comprise aspen particles.

4. The wood composite of claim 1, wherein said wood particles comprise Southern pine particles.

5. The wood composite of claim 1, wherein said binder is a phenolic resin.

6. The wood composite of claim 1, wherein said binder is a urea-formaldehyde resin.

7. The wood composite of claim 1, wherein said wood stabilizer comprises copper ammonium carbonate.

8. The wood composite of claim 6, wherein said wood stabilizer comprises copper ammonium acetate.

9. The wood composite of claim 1, wherein said wood stabilizer comprises ammoniacal metal/dimethyl glyoxime.

10. The wood composite of claim 1, wherein said wood stabilizer comprises ammoniacal copper naphthenate.

11. The wood composite of claim 1, wherein the swelling value is less than about 75% of the swelling value of an analogous wood composite not treated with said wood stabilizer.

12. The wood composite of claim 1, having a swelling value that is less than about 60% of the swelling value of an analogous wood composite not treated with said wood stabilizer.

13. The wood composite of claim 1, having a swelling value that is less than about 45% of the swelling value of an analogous wood composite not treated with said wood stabilizer.

14. The wood composite of claim 1, further comprising a water repellant.

15. The wood composite of claim 14, wherein said water repellant is a paraffinic wax.

16. The stabilized wood composite of claim 14, wherein said water repellant is slack wax.

17. The wood composite of claim 1, wherein said wood stabilizer is present in an amount effective to reduce the rate of deterioration of said wood composite to less than that of an analogous wood composite not treated with said wood stabilizer.

18. A method of producing a wood composite having a reduced swelling value comprising:
   A. providing wood particles,
   B. treating said wood particles with a wood stabilizer comprising copper ammonium carbonate, copper ammonium acetate, ammoniacal copper borate, ammoniacal metal/dimethyl glyoxime, ammoniacal copper naphthenate, or combinations thereof, in an amount effective to provide a swelling value that is less than that of an analogous wood composite not treated with said wood stabilizer; and
   C. binding said wood particles together to form a wood composite.

19. A method of treating a composite wood product, comprising:
   A. providing a green wood furnish;
   B. treating the green wood furnish with at least one treatment agent comprising a fire retardant, wood preservative, dye, pigment, stain, bleach, or water repellant;
   C. after treating the green wood furnish, drying the treated green wood furnish, forming a dried furnish; and
   D. applying a binder to the dried furnish.

20. The method of claim 19, further comprising, after applying the binder, forming the dried wood furnish into a structural member.

21. The method of claim 20, wherein the structural member is an oriented strand board.

* * * * *